J. MacLAURIN.
METHOD OF SUPPLYING AN ARTICLE WITH WATERPROOFING ADHESIVE.
APPLICATION FILED MAR. 30, 1920.

1,413,921. Patented Apr. 25, 1922.

Inventor.
John MacLaurin,
By his atty.,
J. H. McCready.

UNITED STATES PATENT OFFICE.

JOHN MacLAURIN, OF BROOKFIELD, MASSACHUSETTS.

METHOD OF SUPPLYING AN ARTICLE WITH WATERPROOFING ADHESIVE.

1,413,921.  Specification of Letters Patent.  Patented Apr. 25, 1922.

Application filed March 30, 1920. Serial No. 369,856.

*To all whom it may concern:*

Be it known that I, JOHN MacLAURIN, a subject of the King of England, and a resident of Brookfield, in the county of Worcester and State of Massachusetts, have invented an Improved Method of Supplying an Article with Waterproof Adhesive, of which the following is a specification, reference being had to the accompanying drawings forming part thereof.

This invention has reference to an improved method of supplying an article or a structure with a suitable adhesive which adhesive, as a result of the carrying out of one or more steps in this improved method, may become waterproof or water resisting.

One object of the invention is to facilitate the applying to an article or structure of an adhesive of a waterproof or water resisting nature.

Other objects of the invention will appear from the following description.

The invention consists in the improved method of supplying an article or a structure with adhesive of a waterproof nature adapted to be utilized, subsequent to its application, to secure or attach said article or structure to another suitable member, whereby treatment to render such adhesive tacky to facilitate its adhesion to said article or structure need not be a treatment which will reduce the effective adhesive quality of such adhesive.

The invention also consists in such other novel steps in the method of applying adhesive and rendering the same waterproof or water resisting as shall hereinafter be more fully described and pointed out in the claims.

In some constructions it is desirable to secure together two pieces, members or articles by means of adhesive of a nature to resist the tendency of moisture to attack the adhesive, in the finished construction, and to weaken such adhesive. In order to resist moisture various kinds of adhesives have been used which adhesives have been known as waterproof or melting adhesives from the fact that such melting adhesives require to be subjected to a temperature above that of the atmosphere to render them sufficiently tacky to become satisfactorily adhesive. In many of the so called waterproof or melting adhesives the treatment which renders them sufficiently tacky for a primary application to an article tends to reduce their capability of adhesiveness when they are again softened or rendered tacky for adhesion to a second article to be secured to said first article. This secondary or ultimate use of the adhesive is often separated from said primary application by a considerable time so that usually the primary tackiness of the adhesive cannot be utilized in said secondary or ultimate use.

Figure 1:
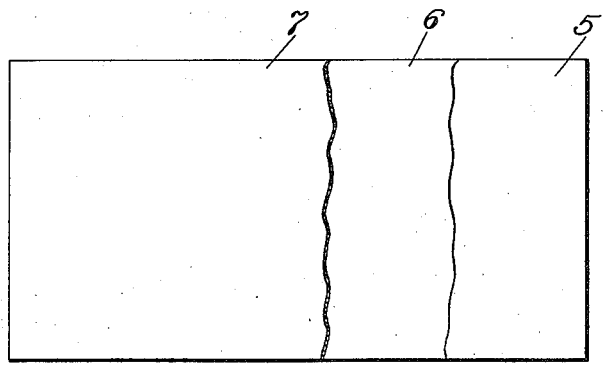
Figure 1, represents a plan view of a piece of material having adhesive adapted to be utilized in carrying out this improved method, parts of the same being broken away.
Figure 2:
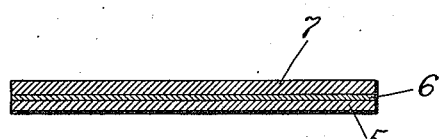
Figure 2, represents a sectional view of the same.
Figure 3:
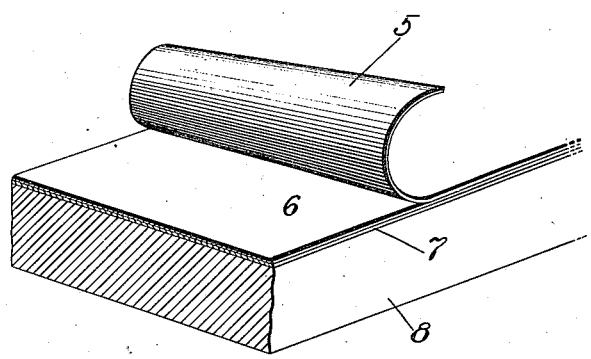
Figure 3, represents a view showing the adhesive as applied to an article or structure, the carrier or backing of said adhesive being partially stripped away.

In carrying this invention into practice I take the backing 5 of paper or other suitable material preferably of an absorbent or loose texture and to one surface of such backing 5 I apply the bond layer 6 which may comprise a mixture of soap, china clay and starch or any other suitable material to constitute a bond coating or layer which may be pervious to liquid and which may have but little strength to resist a tearing strain. On the surface of the bond layer or coating 6 I apply and temporarily secure the coating 7 of animal glue or of any other well known glue or adhesive adapted to be rendered tacky by the application thereto of moisture and also of a nature to be rendered waterproof or water resisting by treatment with formaldehyde or other waterproofing agent. It will be understood that in speaking herein of a waterproof adhesive the term "waterproof" is used to designate the quality of being relatively insoluble in water and therefore of resisting the tendency of water or moisture to affect the adhesive and reduce its holding power.

By the above mentioned steps I am able to provide the adhesive in such form that its application to an article or a structure is facilitated and the backing 5 and bond layer 6 may assist in maintaining a quantity of liquid waterproofing agent in contact with the adhesive 7.

In carrying out the subsequent steps of this improved method the exposed surface of the adhesive 7 is rendered tacky by the application thereto of moisture preliminary to or during the application of such exposed surface of the adhesive 7 to the article, structure or work 8 onto which said adhesive is pressed smoothly by subjecting the outer surface of the backing 5 to pressure evenly applied to such backing.

After the application of the adhesive 7 to the work, as just above described, and in some cases after the adhesive has become somewhat dry I saturate the backing 5 with the formaldehyde or other waterproofing agent which latter passes through the bond layer 6 and acts on the adhesive 7 to render said adhesive resistant to moisture but does not affect its adhesive property so long as it remains moist.

Usually before the formaldehyde or other waterproofing agent wholly evaporates from the backing 5 I strip such backing and the bond coating 6 from the adhesive 7 thus leaving the surface of the adhesive exposed to receive an article or member to be superposed thereon and to be attached by said adhesive to the work 8. Owing to the weakness of the bond layer 6 the stripping of backing 5 from the adhesive may be accomplished at any time after the application of the adhesive 7 to the work 8 and the treatment of the adhesive 7 with the waterproofing agent may occur after the removal of backing 5.

By this improved method the adhesive 7 when affixed to the work 8 is water resistant and yet retains its inherent adhesive qualities.

Having thus described my invention I claim as new and desire to secure by Letters Patent:

1. That method of supplying waterproof adhesive to a structure which consists in preparing a backing having a coating of animal glue, rendering said glue tacky, applying said tacky glue to a structure, saturating said backing with formaldehyde to effect a waterproofing of said glue, and removing said backing.

2. The method of supplying a waterproof adhesive to a structure which consists in preparing a backing having a coating of adhesive adapted to be rendered tacky by the application thereto of moisture and also of a nature to be rendered waterproof when treated with a suitable agent, moistening said adhesive, applying said adhesive while so moistened and in a tacky condition to said structure, subsequently saturating said backing with said waterproofing agent and then removing said backing.

In testimony whereof I have signed my name to this specification.

JOHN MacLAURIN.